United States Patent
Lu et al.

(10) Patent No.: US 11,283,969 B2
(45) Date of Patent: Mar. 22, 2022

(54) SYSTEM AND METHOD FOR MANAGING A VIRTUAL STUDIO

(71) Applicant: Oath Inc., New York, NY (US)

(72) Inventors: Tony Lu, San Jose, CA (US); Gongxun Liu, Sunnyvale, CA (US); Ming Hay Luk, Walnut Creek, CA (US); Gabriel Audick, Los Angeles, CA (US); Suraj Sirpilli, Santa Clara, CA (US); Tiju Jose, San Jose, CA (US); Arunkumar Balasubramanian, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/536,522

(22) Filed: Aug. 9, 2019

(65) Prior Publication Data

US 2021/0044726 A1 Feb. 11, 2021

(51) Int. Cl.
*H04N 5/222* (2006.01)
*H04N 21/262* (2011.01)
*H04N 21/218* (2011.01)
*H04N 5/265* (2006.01)

(52) U.S. Cl.
CPC .......... *H04N 5/2224* (2013.01); *H04N 5/265* (2013.01); *H04N 21/21805* (2013.01); *H04N 21/26241* (2013.01)

(58) Field of Classification Search
CPC .................. H04N 5/2224; H04N 5/265; H04N 21/21805; H04N 21/26241
See application file for complete search history.

(56) References Cited

U.S. PATENT DOCUMENTS

| | | | |
|---|---|---|---|
| 9,001,178 B1 * | 4/2015 | Leske | H04N 7/155 348/14.08 |
| 9,013,539 B1 * | 4/2015 | Fulay | H04L 65/403 348/14.08 |
| 10,516,911 B1 * | 12/2019 | Nielsen | H04N 21/4305 |
| 2005/0122392 A1 * | 6/2005 | Johansen | H04M 3/562 348/14.09 |
| 2007/0263825 A1 * | 11/2007 | Shah | H04L 12/1818 379/202.01 |
| 2008/0091778 A1 * | 4/2008 | Ivashin | G06Q 10/10 709/204 |
| 2008/0092173 A1 * | 4/2008 | Shannon | H04N 21/482 725/47 |
| 2008/0163059 A1 * | 7/2008 | Craner | H04N 21/4316 715/719 |

(Continued)

*Primary Examiner* — Fernando Alcon
(74) *Attorney, Agent, or Firm* — Venable LLP

(57) ABSTRACT

The present teaching relates to method, system, medium, and implementations for managing a virtual studio. A plurality of single data streams from a plurality content contributors are received. When a request is received, via public network connections, for creating a composite data stream associated with a virtual room in the virtual studio, signaling information is generated for constructing the composite data stream by stitching together some of the plurality of single data streams selected to be incorporated in the composite data stream in accordance with a layout. When an access request is received from an end user to access the composite data stream, the composite data stream is delivered to the end user in response to the access request.

20 Claims, 14 Drawing Sheets

(56) References Cited

U.S. PATENT DOCUMENTS

| | | | |
|---|---|---|---|
| 2009/0089352 A1* | 4/2009 | Davis | H04N 21/812 709/201 |
| 2013/0294749 A1* | 11/2013 | Burns | H04N 21/41407 386/278 |
| 2015/0020102 A1* | 1/2015 | Yoo | H04N 21/25891 725/41 |
| 2018/0035136 A1* | 2/2018 | Crowe | H04N 21/4316 |

* cited by examiner

SYSTEM AND METHOD FOR MANAGING A VIRTUAL STUDIO

BACKGROUND

1. Technical Field

The present teaching generally relates to computer. More specifically, the present teaching relates to generating data.

2. Technical Background

With advancement of electronics for acquiring data anywhere/anytime and the ubiquitous network connections, data may be potentially consumed by users in any manner desired. Unfortunately, this potential is currently not realized. For example, video data may be acquired by millions of people from many different locations. Currently, they are consumed as stand-alone data streams via, e.g., YouTube or other platforms. Although different video streams may convey, when combined, better or more complete information to a content consumer, presently only professional companies/individuals may be equipped to perform the task of combining different data streams into a composite one. For example, for sports broadcast, a broadcasting company, such as ABC Studio, may have a crew of camera men at the sports scene to acquire videos from different perspectives and with, e.g., different levels of details. The ABC studio may have a professional team to work at the studio to selectively use different data streams to form a composite data stream via, e.g., editing, for broadcasting that may enable a viewer to see data from different cameras at the same time. For instance, the program may include the video of sports commentators explaining what is going on in the game and at the same time, a small window may also appear in the composite data stream with an alive video of the sports game so that a viewer can listen to the commentator and at the same time watch the game from the small window.

Traditionally, such composite data stream can only be created by professional studios. As such, the vast data acquired by crowd users are not presently utilized in an effective manner and based on different needs. Thus, there is a need for methods and systems that address such limitations.

SUMMARY

The teachings disclosed herein relate to methods, systems, and programming for managing data. More particularly, the present teaching relates to methods, systems, and programming related to managing a virtual studio.

In one example, a method, implemented on a machine having at least one processor, storage, and a communication platform capable of connecting to a network for managing a virtual studio. A plurality of single data streams from a plurality content contributors are received. When a request is received, via public network connections, for creating a composite data stream associated with a virtual room in the virtual studio, signaling information is generated for constructing the composite data stream by stitching together some of the plurality of single data streams selected to be incorporated in the composite data stream in accordance with a layout. When an access request is received from an end user to access the composite data stream, the composite data stream is delivered to the end user in response to the access request.

In a different example, a system for managing a virtual studio. The system includes a content contributor interface manager, a user interface manager, a composite data stream generator, and a composite data stream distributor. The content contributor interface manager is configured for obtaining a plurality of single data streams from a plurality content contributors. The user interface manager is configured for a receiving a request, from a composite content producer via a publicly accessible network connection, to create a composite data stream associated with a virtual room in the virtual studio. The composite data stream generator is configured for generating, based on the request, the composite data stream by selecting multiple of the plurality of single data streams that are to be included in the composite data stream in accordance with a layout specified in the request and generating signaling information to be used to construct the composite data stream by stitching together the multiple single data streams in accordance with the layout. The composite data stream distributor is configured for delivering the composite data stream to an end user related to the virtual room in response to an access request received from the end user to access the composite data stream.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for managing a virtual studio, wherein the medium, when read by the machine, causes the machine to perform a series of steps. A plurality of single data streams from a plurality content contributors are received. When a request is received, via public network connections, for creating a composite data stream associated with a virtual room in the virtual studio, signaling information is generated for constructing the composite data stream by stitching together some of the plurality of single data streams selected to be incorporated in the composite data stream in accordance with a layout. When an access request is received from an end user to access the composite data stream, the composite data stream is delivered to the end user in response to the access request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional approaches to generate composite content that requires such operations to be performed with professional equipment in a professional studio. The present teaching discloses a virtual studio management scheme that allows any user to be a composite content producer to generate composite data streams via network connections based on content data crowd sourced from different content contributors. It provides a more accessible online system that does not require professional equipment or skill to create virtual studios with virtual rooms having such composite content associated therewith for user consumption. The virtual studio scheme provided herein also facilitates other online users to access any composite content in different virtual rooms by remotely participating in the virtual studio and is configured to delivering any requested composite content in the virtual studio to anywhere at any time in accordance with a desired schedule specified by a content consumer.

Figure 1A:
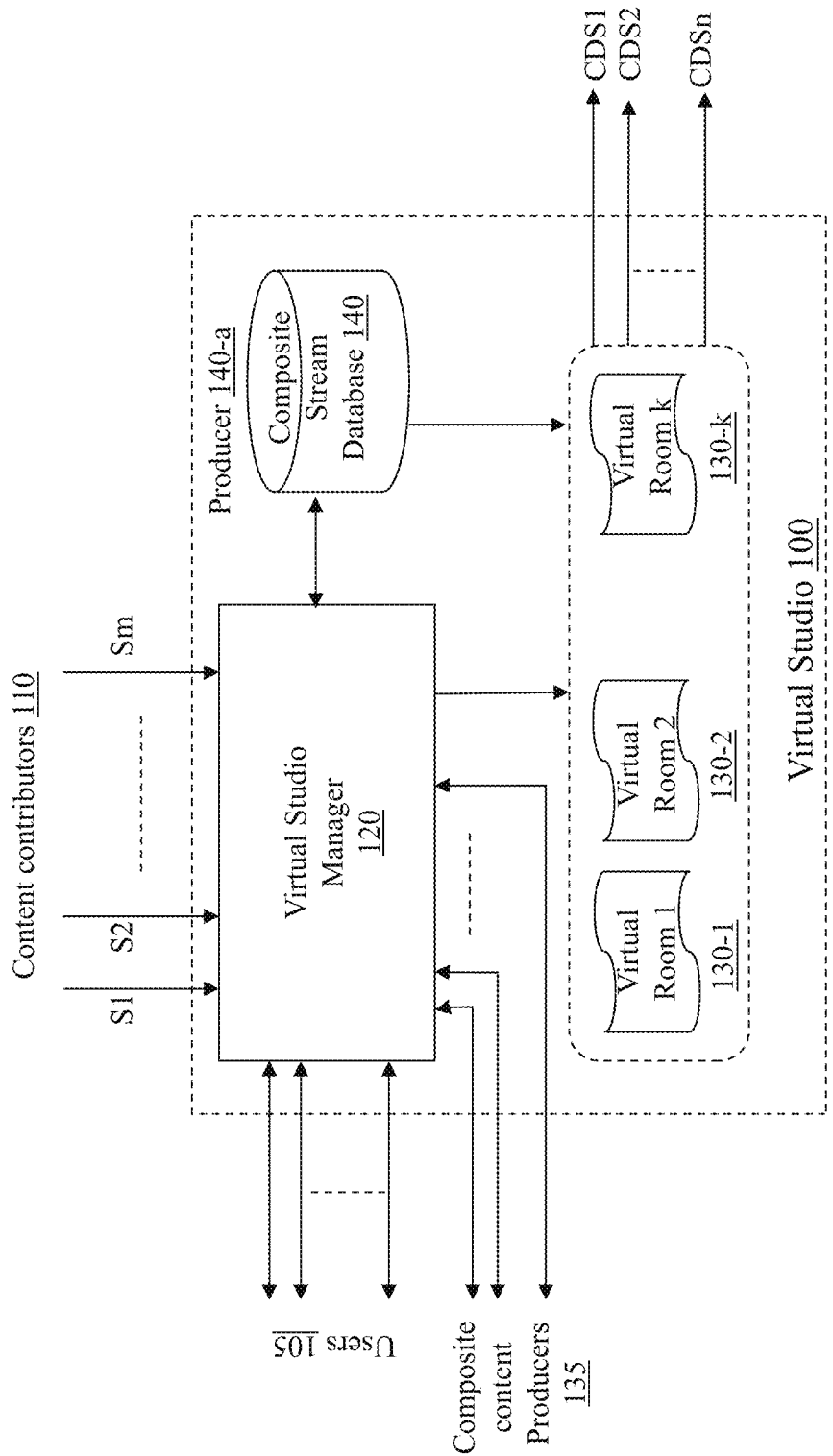
FIG. 1A depicts a virtual studio for managing a virtual studio with virtual rooms having composite data streams, in accordance with an embodiment of the present teaching.

FIG. 1A depicts a virtual studio 100 for managing a virtual studio with virtual rooms having composite data streams, in accordance with an embodiment of the present teaching. The virtual studio comprises a virtual studio manager 120, one or more virtual rooms 130-1, 130-2, . . . , 130-k, each of which is associated with composite data content stored (and indexed) in a composite data stream database 140. The virtual studio manager 120 is connected with a plurality of end users (content consumers) 105, a plurality of content contributors 110, and one or more composite content producers 135. The content contributors are those who contribute their content to the virtual studio so that some composite content producers may utilize such contributed content to compose composite content. The end users and content contributors may overlap. Similarly, some end users may also be composite content producers, i.e., some of the end users may also create composite content for others to consume. Some of the content contributors may also be composite content producers. The virtual studio manager 120 receives multiple content streams contributed by individual content contributors and makes them available for composite content producers to use to generate composite content streams. Such composite content may be associated with different virtual rooms created by, e.g., the composite content producers and may be accessed or consumed by the end users 105. The virtual studio manager 120 is configured to facilitate all aspects of the virtual studio from creation of virtual rooms with composite data streams to sign up participants of different virtual rooms upon requests, and to schedule delivering any composite data streams to any end user upon request, and to carry out the delivery of the requested data based on the schedules.

Figure 1B:
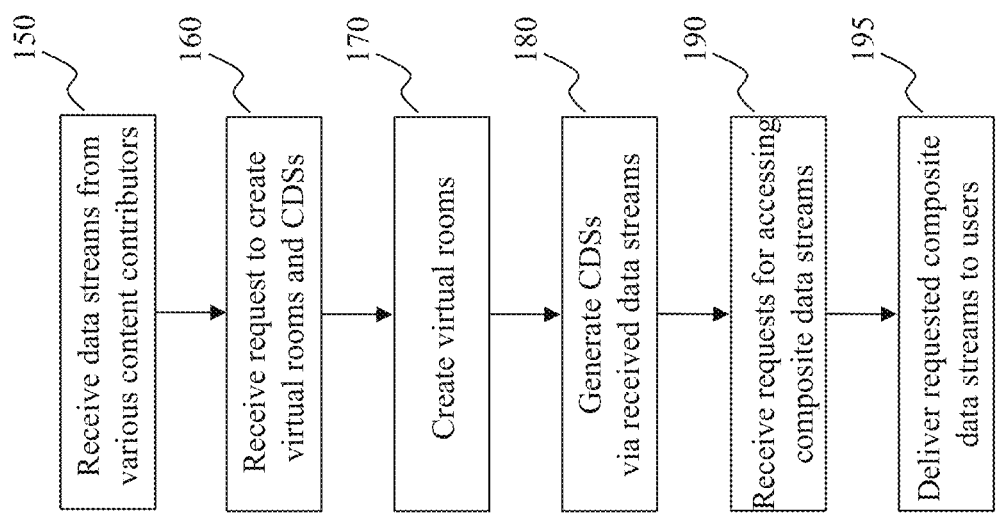
FIG. 1B is a flowchart of an exemplary process of a virtual studio for managing a virtual studio with virtual rooms having composite data streams, in accordance with an embodiment of the present teaching.

FIG. 1B is a flowchart of an exemplary high level process of the virtual studio 100 for managing a virtual studio with virtual rooms having composite data streams, in accordance with an embodiment of the present teaching. Data streams crowd sources from multiple content contributors may be received at 150. When a request is received at 160 from a composite content producer to generate composite data content associated with a virtual room, it is analyzed whether the virtual already exists or not yet exist. If the virtual room does not yet exist, the virtual studio manager 120 facilitates the creation of the virtual room at 170 based on the request. Then the virtual studio manager 120 interfaces with the composite data stream producer to generate, at 180, the composite data stream (CDS) associated with the virtual room. With the virtual room and the associated CDS generated, when a request is received, at 190, to access the CDS, the virtual studio manager 120 schedules to deliver, at 195, the requested CDS to the user who requested it.

In some embodiments, the virtual studio manager 120 may reside independently in a network setting so that it serves as a software as a service. As such, anyone who is connected to the network may sign up with the virtual studio manager 120 to obtain services associated with creation and management of a virtual studio with virtual rooms having composite data content created based on crowd sources content from multiple sources and sharing of such virtual studio content with others connected to the network.

Figure 2:
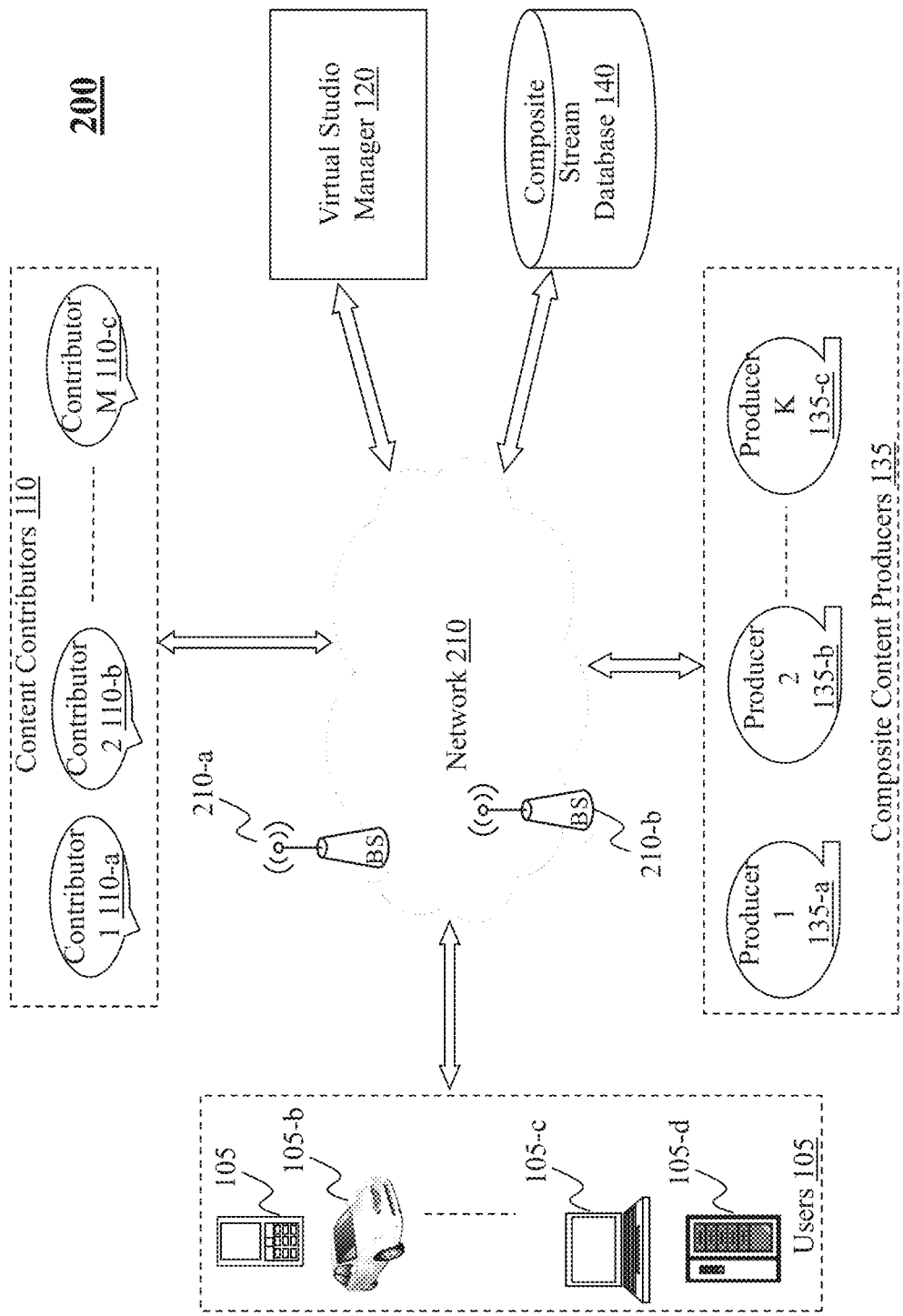
FIG. 2 depicts a networked environment in which a virtual studio manager facilitating management of a virtual studio with virtual rooms having composite data streams generated based on multiple data streams from different content contributors, in accordance with an embodiment of the present teaching.
Figure 3:
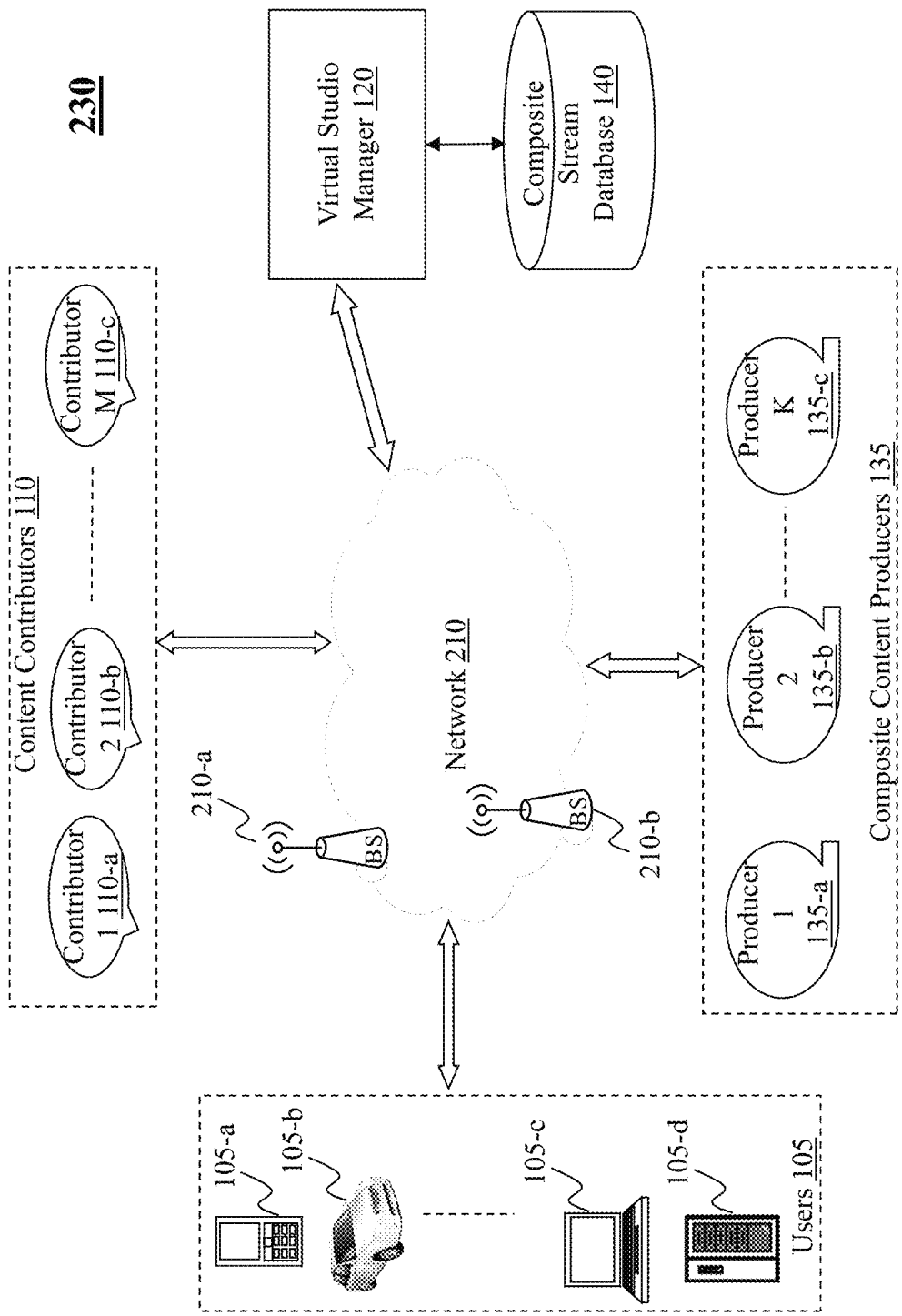
FIG. 3 depicts an alternative networked environment in which a virtual studio manager facilitating management of a virtual studio with virtual rooms having composite data streams generated based on multiple data streams from different content contributors, in accordance with an embodiment of the present teaching.

FIG. 2 depicts such a networked environment 200 in which the virtual studio manager 120 stands alone in the network to provide services that facilitate management of a virtual studio with virtual rooms having composite data streams generated based on multiple data streams from different content contributors, in accordance with an embodiment of the present teaching. In this exemplary setting, the virtual studio manager 120 connects to end user 105, the content contributors 110, and composite content producers 135 via network 210. In this illustrated embodiment, the composite data stream database 140 may reside also independently on the network, i.e., the virtual studio manager 120 may manage the generated data via network connections. For instance, a composite content producer may invoke the virtual studio manager 120 to assist to generate composite content and then save the generated content in, e.g., the cloud for future use and access. FIG. 3 depicts an alternative networked environment 230 in which the composite content generated using the virtual studio manager 120 may be still stored in the backend for continued management by the virtual studio manager, in accordance with an embodiment of the present teaching.

In the exemplary networked environments 200 and 230, each of the parties involved may be connected to the virtual studio manager 120 via different devices. As shown, a user may connect with the virtual studio manager 120 via device 105-a, 105-b, 105-c, or 105-d. The network 210 may correspond to a single network or a combination of different networks. For example, network 210 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 210 may also include various network access points. For example, environments 200 and 230 may include wired or wireless access points such as, without limitation, base stations or Internet exchange points 210-a, ..., 210-b. Base stations 210-a and 210-b may facilitate, for example, communications to/from user devices 105, the composite content producers 135, and/or the content contributors 110 with one or more other components of the virtual studio manager 120 across different types of network.

A user device, e.g., 105-a, may be of different types to facilitate a user operating the user device to connect to network 210 and transmit/receive signals. Such a user device 105 may correspond to any suitable type of electronic/computing device including, but not limited to, a desktop computer (105-d), a mobile device (105-a), a device incorporated in a transportation vehicle (105-b), ..., a mobile computer (105-c), or a stationary device/computer (105-d). A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.). The device a composite content producer or a content contributor uses may also correspond to different types. The virtual studio manager 120 may be implemented as an application which may be downloaded to any device operated by an end user for accessing data, by a content contributor for uploading contributing data streams, or by a composite content producer for interfacing with the virtual studio manager 120, e.g., for accessing contributing content, for creating virtual rooms, for providing specification of how to generate a composite data stream, or providing other instructions to the virtual studio manager 120 in order to manage the relevant virtual rooms.

Figure 4:
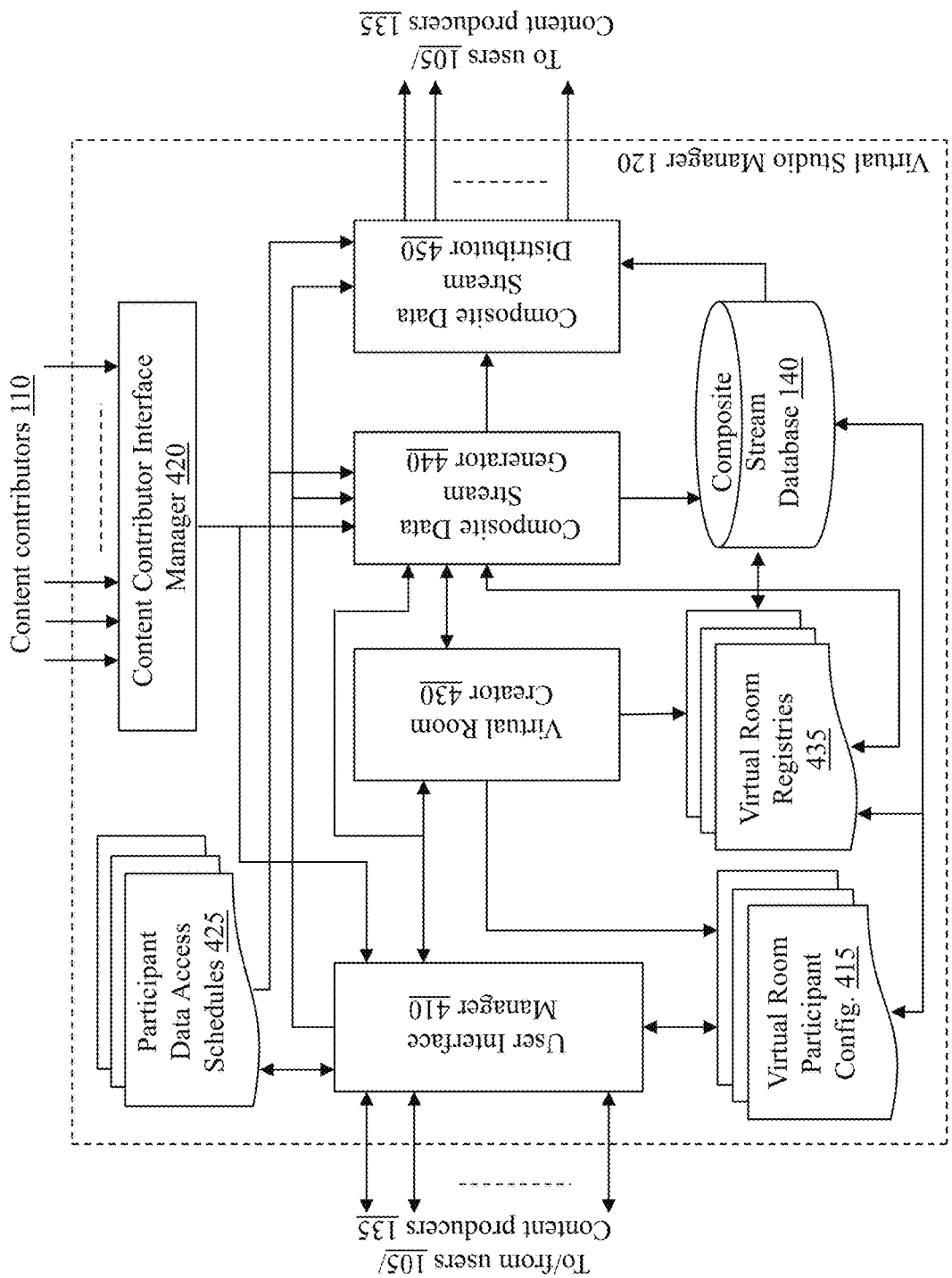
FIG. 4 depicts an exemplary high level system diagram of a virtual studio manager, in accordance with an embodiment of the present teaching.

FIG. 4 depicts an exemplary high level system diagram of the virtual studio manager 120, in accordance with an embodiment of the present teaching. In this illustrated embodiment, the virtual studio manager 120 is configured to handle several aspects of the operation. On exemplary aspect of the operation is related to crowd sourcing content contributed by different content contributors. Another aspect of the operation is related to generating virtual rooms and associated composite content. Yet another aspect of the operation is for providing the means to allow end users to consume the composite content associated with different virtual rooms in the virtual studio and carry out the delivery of any composite content to any end user who desires in accordance with a schedule preferred by the user.

To enable these aspects of the operation, the virtual studio manager 120 comprises a content contributor interface manager 420, a user interface manager 410, a virtual room creator 430, a composite data stream generator 440, and a composite data stream distributor 450. These components serve different aspects of the operation as follows. The content contributor interface manager 420 may be configured to be connected with different content contributors and communicate with them to acquire content, and optionally perform certain transformations of the received content in order to facilitate the use by composite content producers for the purpose of generating composite content. For instance, content from different devices may be from different platforms so that they are in different formats so that they may need to be transformed into some uniform format to facilitate integration. The output of the content contributor interface manager 420 may be processed content based on the native content from the content contributors.

With content from different contributors available, the virtual studio manager 120 may make such information available so that people who desire to utilize such rich source of information is made aware and communicate with the virtual studio manager 120 to create virtual rooms and the associated composite content. This is related to the aspect of the operation of the virtual studio manager 120 to facilitate composite content producers to create virtual rooms in the virtual studio and the generation of the associated composite content. The user interface manager 410 is configured to communicate with a composite content producer to obtain information from a composite content producer and then invoke the virtual room creator 430 to handle creation of requested virtual rooms and/or the composite data stream generator 440 to handle generation of requested composite data stream associated with.

The virtual room creator 430, once invoked, acts to create virtual room as requested and register each such created virtual room in a virtual room registries 435. When the composite data stream generator 440 is invoked, it may interface further with a composite content producer who requested to generate a composite data stream associate with a virtual room to obtain various parameters/instructions specifying how the composite data stream is to be generated based on which data portion from which data streams from content contributors. For example, such instructions may indicate selected data streams from others, different portions/tracks to be used from different selected data streams to be incorporated in the composite data stream, the spatial arrangement of the selected data streams in the composite data stream, and/or any restrictions that may be imposed on the composite data stream as to who is allowed to access the composite data.

Figure 5C:
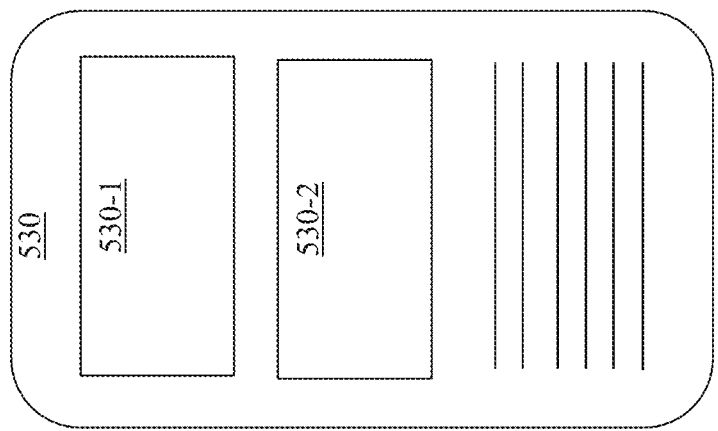
FIGS. 5A-5C show different exemplary layouts of multiple data streams in a composite data stream.
Figure 5B:
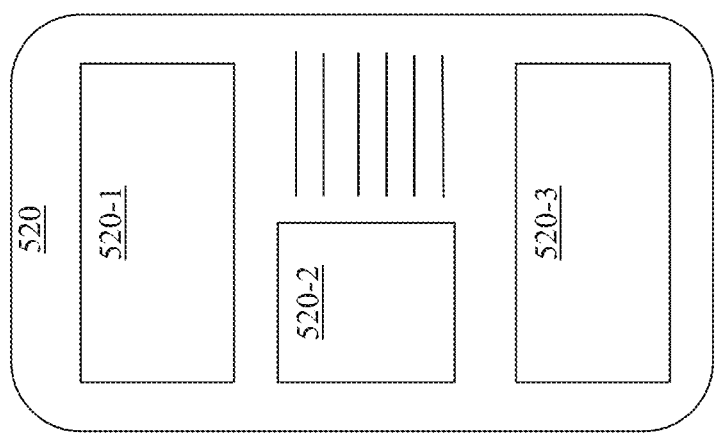
Figure 5A:
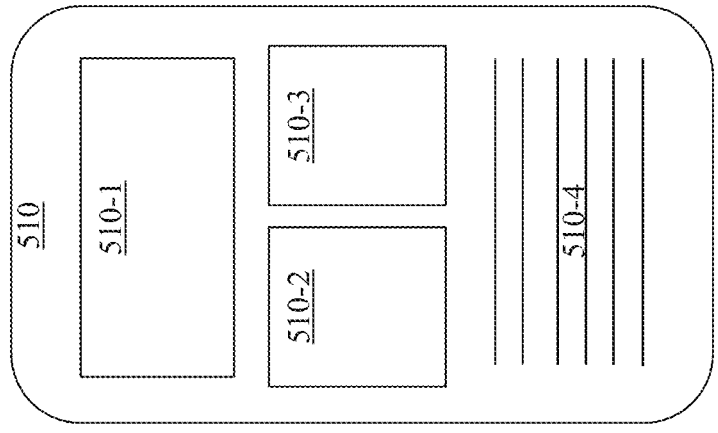

FIGS. 5A-5D illustrate different parameters that a composite content producer may specify. FIGS. 5A-5C show different layouts of composite data streams. For instance, FIG. 5A shows a composite data stream 510 which incorporates data streams from at least three content sources, displayed in spatial areas 510-1, 510-2, and 510-3 of the composite data stream. In this exemplary composite data stream, content displayed in 510-1 may be data from a first content contributor, content displayed in spatial area 510-2 may be content from a second content contributor, and content displayed in spatial area 510-3 may be from yet another different content contributor. Content from each content contributor may be motion pictures and selected portions from each content piece may be displayed in their respective spatial area of the composite data stream. For example, a family may have different members located in different geographical regions. They may take different trips to different parts of the world and may like to share their experiences recorded in videos with other family members. In this case, each of the displayed area may show the video of one of the trips a family member took. If there are three family members who have videos to share, they can be composed together to form a composite data stream with a layout such as shown in FIG. 5A. Not only three videos may be shown simultaneously but also at any time period, audio from one of the videos may be made audible and different audio tracks from different videos may either rotate to be played back or selectively playback based on the content. Such a composite data stream may also display text such as in the area which enable the producer to edit something interesting to the family members who consume the composite content.

Different layouts are also possible and can be flexibly specified by a composite content producer. FIG. 5B shows an alternative arrangement 520 with three different video content displayed in spatial areas 520-1, 520-2, and 520-3 of in the same composite data stream. FIG. 5C shows another alternative composition of a composite data stream 530 with two video content simultaneously displayed in two spatial areas 530-1 and 530-2 of the composite data stream. Such a composite data stream, as the content of the composition videos are stitched together in an overall composite data stream with each spatial area rendered with video content from different sources, a consumer of such a composite data stream may view all content from different sources at the same time.

In addition to a layout of selected data streams in the composite data stream, a producer may also control, via the virtual studio manager 120, how different portions/tracks of each of the data streams may be utilized to compose the composite data stream. As discussed above, although several videos may be incorporated into one composite data stream, it is likely that most of the time, the sound track of the composite data stream may have only the sound from a particular content source, whether from one of the videos incorporated or from another independent source such as a voice commentary from the composite content producer. In addition, as the lengths of videos incorporated into the composite data stream may differ, such videos may need to be edited or portions (particularly interesting ones) may be selected to be incorporated and other portions of the original videos may be discarded. Parameters specifying which tracks of which video to be used at different times as well as which portions of each of the videos to be actually used in the composite data stream may be provided by the producer in communication with the user interface manager 410.

Figure 5D:
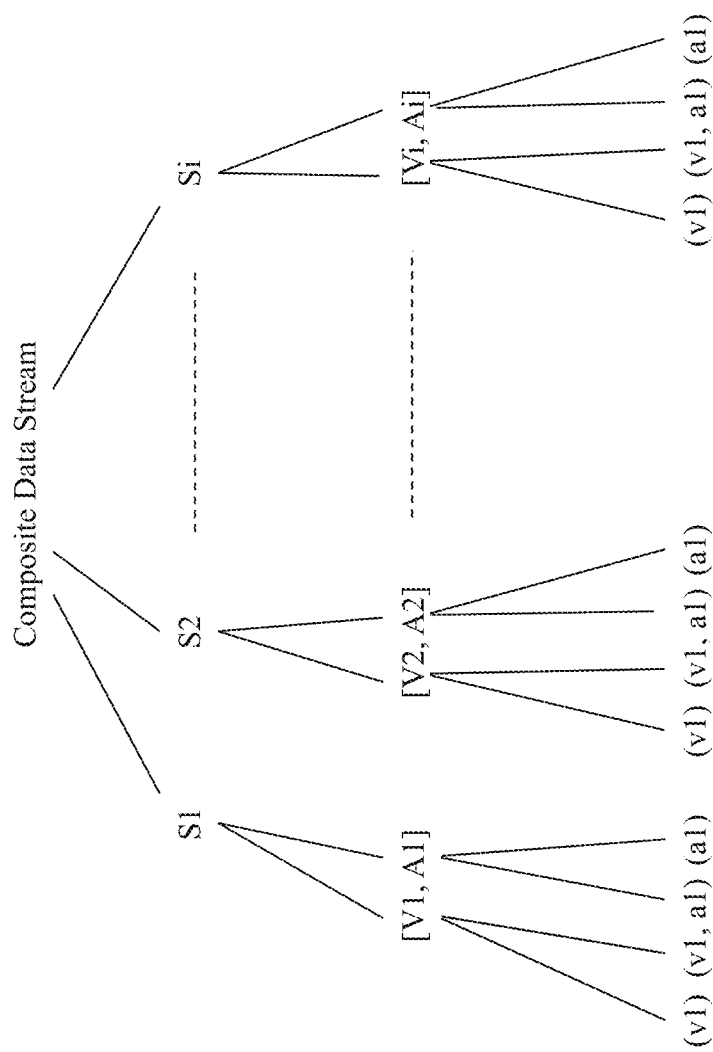
FIG. 5D illustrates different exemplary options of selective use of multimedia data in multiple data streams to compose a composite data stream.

FIG. 5D illustrates possible edits that a producer may be specify in order to select desired tracks/portions of the contributing content. A composite data stream may be composed using multiple data streams S1, S2, . . . , Si, each of which may include both visual track V and audio track A. Data stream S1 has [V1, A1], data stream S2 has [V2, A2], . . . , etc. For each time period, a producer has options to select in different ways, e.g., selecting only visual track without audio track, selecting audio track only without visual information, selecting both tracks, or select none of the tracks (discard the portion). The composite data stream is generated based on such parameters specified by a producer. Together with the layout configuration as illustrated in FIGS. 5A-5C, such parameters may be used to selectively use certain tracks/portions of different pieces of contributing data stream to be displayed in the composite data stream.

As discussed herein, such functions of the virtual studio manager 120, when provided as software as a service, enables any person connected to the network to invoke the virtual studio manager 129 to perform tasks to compose composite data stream without professional equipment or skill. Such a virtual studio manager 120 makes the job easily facilitated and accessible to many to take advantage of the vastly available data from different sources.

Once the composite data streams associated with a virtual room are generated, they are saved in the composite data stream database 140. Information related to the availability of the composite data streams may be incorporate into the virtual room registries 435, e.g., a listing of composite data streams accessible under each virtual room. In some embodiments, indices may also be stored with the information related to each virtual room and such indices may point to the storage location where the corresponding composite data streams reside. With such established records associated with the virtual rooms, the virtual studio manager 120 may proceed to make such information known to whoever may desire to consume. In some embodiments, the user interface manager 410 may access the information stored in the virtual room registries 435 and announce it to an audience as to what is available in each of the virtual rooms of the virtual studio.

The audience to whom the virtual studio manager 120 may contact for data consumption may be determined in different ways. In some embodiments, the producer of each of the virtual room may dictate who will be the audience of the virtual room. In some embodiments, the producer of each composite data stream may specify the audience who can access the composite data. In some embodiments, the virtual studio manager 120 may set up some default group of people as the audience. In some embodiments, the audience scope associated with each composite data stream or virtual room may be specified based on a combination of a default setting and some restrictions desired by the producer of the composite content. When any end user in the audience who receives the notification may respond to send a request to the virtual studio manager 120 to participate a virtual room interested. The user interface manager 410 communicates with any of such end users and sign them up with virtual rooms that the end users specify to join. Such participation information is stored in virtual room participant configuration 415. In some embodiments, all composite data streams in a virtual room may be made accessible to the end users who participate in the virtual room. In some embodiments, a participant of a virtual room may still be subject to certain access restrictions to certain composite data streams associated therewith.

To accommodate the end user access of composite data in the virtual studio, the user interface manager 410 may further communicate with participants of different virtual rooms on their data access request and distribution of the requested content. An end user who requests to access certain composite data stream associated with a certain virtual room may specify different access parameters, e.g., the device (e.g., a smart phone or a desktop, which impacts the formfactor in which the composite data may be delivered) to receive the composite data, the platform of the device (e.g., Apple platform or Android platform which may impact how the composite data may be formatted), the desired date/time to receive the composite data, etc. Based on such specified parameters, the user interface manager 410 may generate a schedule for each requested access and store such information in storage 425 for participant composite data access schedules.

To distribute requested composite data streams to requested participants (end users), the composite data stream distributor 450 checks the schedule for each request, accesses the requested composite data stream from the composite data stream database 140, generates the requested composite data stream appropriately based on the parameters the user specified, and then transmits the appropriately packaged composite data stream to the requesting end user.

Figure 6A:
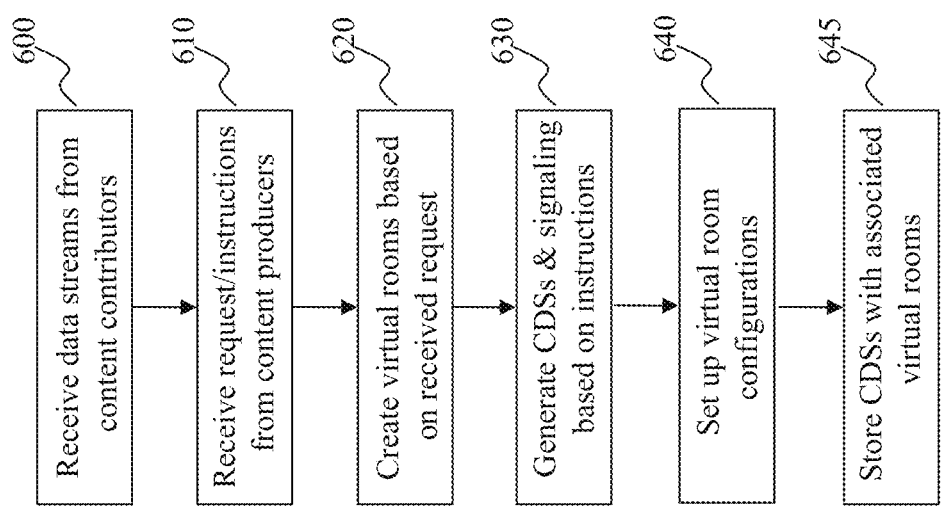
FIG. 6A is a flowchart of an exemplary process of a virtual studio manager in creating a composite data stream associated with a virtual room and the corresponding signaling thereof, in accordance with an embodiment of the present teaching.

FIG. 6A is a flowchart of an exemplary process of the aspect of the virtual studio manager 120 for creating virtual rooms with associated composite data streams and signaling thereof, in accordance with an embodiment of the present teaching. As discussed herein, the data streams contributed by different content contributors may be received at 600. When a request is received from composite content producer, the user interface manager 410 interacts with the producer to obtain, at 610, instructions/parameters associated with the virtual room and associated composite data stream to be generated. Based on the request, a virtual room is created accordingly at 620 and the composite data stream is generated, at 630, based on the instructions/parameters specified by the producer. Based on the virtual room created as well as the associated composite data stream generated, the virtual studio manager 120 sets up, at 640, the registration of the virtual room, stores, at 650 the composite data stream with, e.g., appropriate indices between the virtual room and the composite data stream.

Figure 6B:
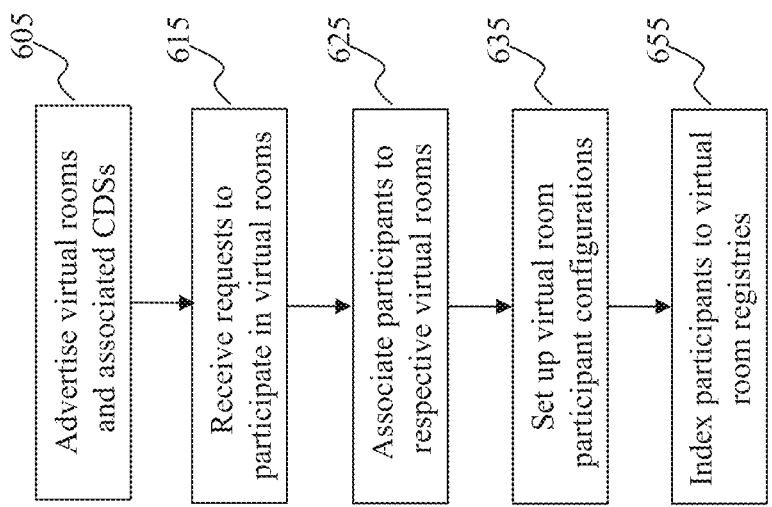
FIG. 6B is a flowchart of an exemplary process of a virtual studio manager for signing up participants with different virtual rooms in a virtual studio, in accordance with an embodiment of the present teaching.

FIG. 6B is a flowchart of an exemplary process of another aspect of the virtual studio manager 120 for signing up participants with different virtual rooms in the virtual studio, in accordance with an embodiment of the present teaching. With virtual rooms and composite data streams generated, to facilitate data consumption, the virtual studio manager 120 advertises, at 605, the availability of the virtual rooms and their associated composite data streams to an audience. As discussed herein, the audience may be determined by the virtual studio manager 120 and/or by the respective producers of the composite content. When a request is received at 615 from an end user to participate a virtual room, the user interface manager 410 associates, at 625, the participant with the requested virtual room to set up, at 635, in virtual room participant configuration 415 of such association. Accordingly, it may also index, at 655, the participant with the virtual room registries 435 to update a list of participants associated with the virtual room.

Figure 6C:
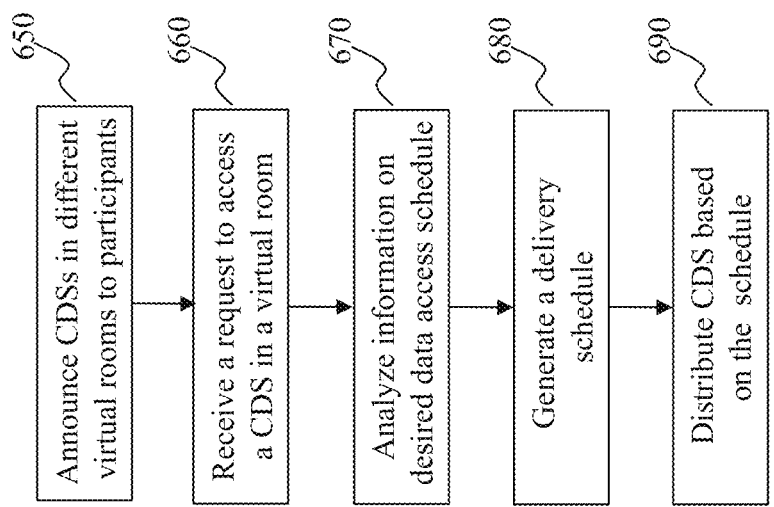
FIG. 6C is a flowchart of an exemplary process of a virtual studio manager for generating on-demand composite data stream distribution schedules and delivery based on that, in accordance with an embodiment of the present teaching.

To facilitate composite data consumption, the virtual studio manager 120 may further make the availability of various composite data streams in different virtual rooms known to their respective participants. FIG. 6C is a flowchart of an exemplary process of yet another aspect of the virtual studio manager 120 for generating on-demand composite data stream distribution schedules and delivery based on that, in accordance with an embodiment of the present teaching. The user interface manager 410 may access the information stored in the virtual room registries 435 (which indexes both the list of participants and the associated composite data streams) and announce, at 650, to the respective list of participants of each virtual room of the available composite data streams in that virtual room. When a request is received, at 660, from a participant (end user) for accessing a composite data stream in the virtual room the end user participates, the user interface manager 410 analyzes, at 670, the request and generates, at 680, a delivery request which may then be stored in the participant data access schedule storage 425. Such stored delivery schedule is then accessed by the composite data stream distributor 450 and used to control the distribution, at 690, of the desired composite data stream to the end user in accordance with the specified preferred delivery schedule.

Figure 7:
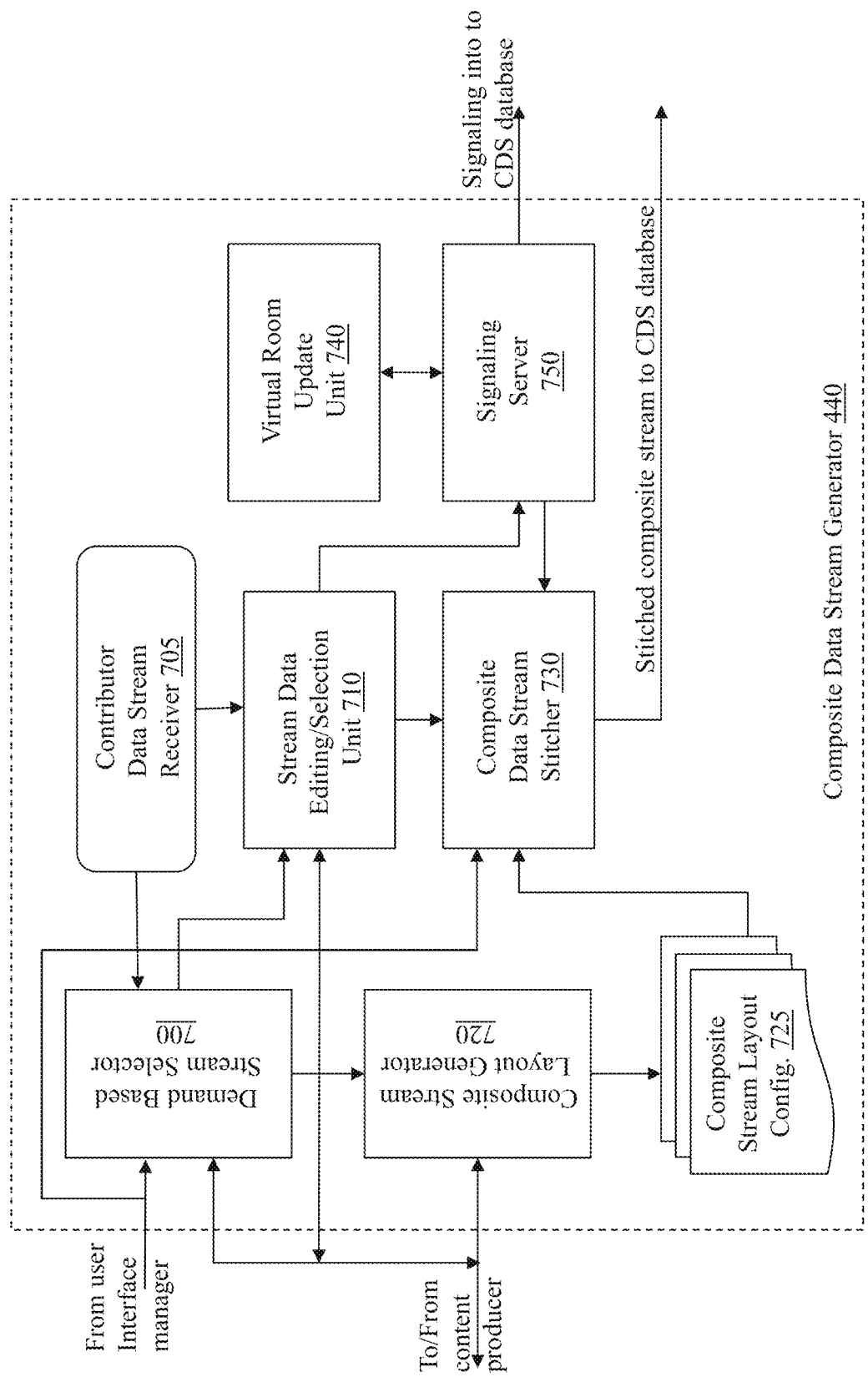
FIG. 7 depicts an exemplary high level system diagram of a composite data stream generator, in accordance with an embodiment of the present teaching.

FIG. 7 depicts an exemplary high level system diagram of the composite data stream generator 440, in accordance with an embodiment of the present teaching. In this exemplary embodiment, the composite data stream generator 440 is to interface with a composite data stream producer to obtain various parameters related to the desired composite data stream, including, but not limited to, the data streams from content contributors for generating the composite data stream, a layout of the composite data stream in which the selected data streams are arranged for display simultaneously, the portions of each of the selected data streams from contributors to be used in the composite data stream, and/or the tracks (e.g., audio or visual or textual) of different portions of the selected data streams to be actually incorporated in the composite data stream. Based on such obtained information, appropriate signaling information may be generated that facilitates selective use of different portions/tracks of information from certain selected data streams in the composite data stream. Such signaling information is to be used to generate the composite data stream. In some embodiments, the signaling information may be used to generate the actual composite data stream which is then saved in the composite data stream database 140 for future access. In different embodiments, the generation of an actual composite data stream may not be carried out until a request is received to access it. In this case, the signaling information may be saved in the composite data stream database 140 and may then be accessed and used to generate the composite data stream, e.g., on-the-fly, whenever the composite data stream is requested by an end user.

The composite data stream is generated based on both the layout information as well as the parameters specified by the producer. The layout information dictates which contributing data stream is displayed in which part of the composite data stream. On the other hand, the parameters obtained related to portions/tracks of the data streams to be incorporated control what specific content (which portions of a data stream and which track of information) from which contributing data stream is to be presented in its designated area in the composite data stream. Once the composite data stream associated with a virtual room is determined (either generated as an actual data stream or its corresponding signaling information is saved so that any future generation is possible whenever needed), the record associated with the virtual room, i.e., a list of what is accessible from the virtual room, is updated to facilitate its access by end users. In some embodiments, such updated information associated with a virtual room may also be used to accordingly update the announcement to participants of the virtual room on updated content list.

Figure 8:
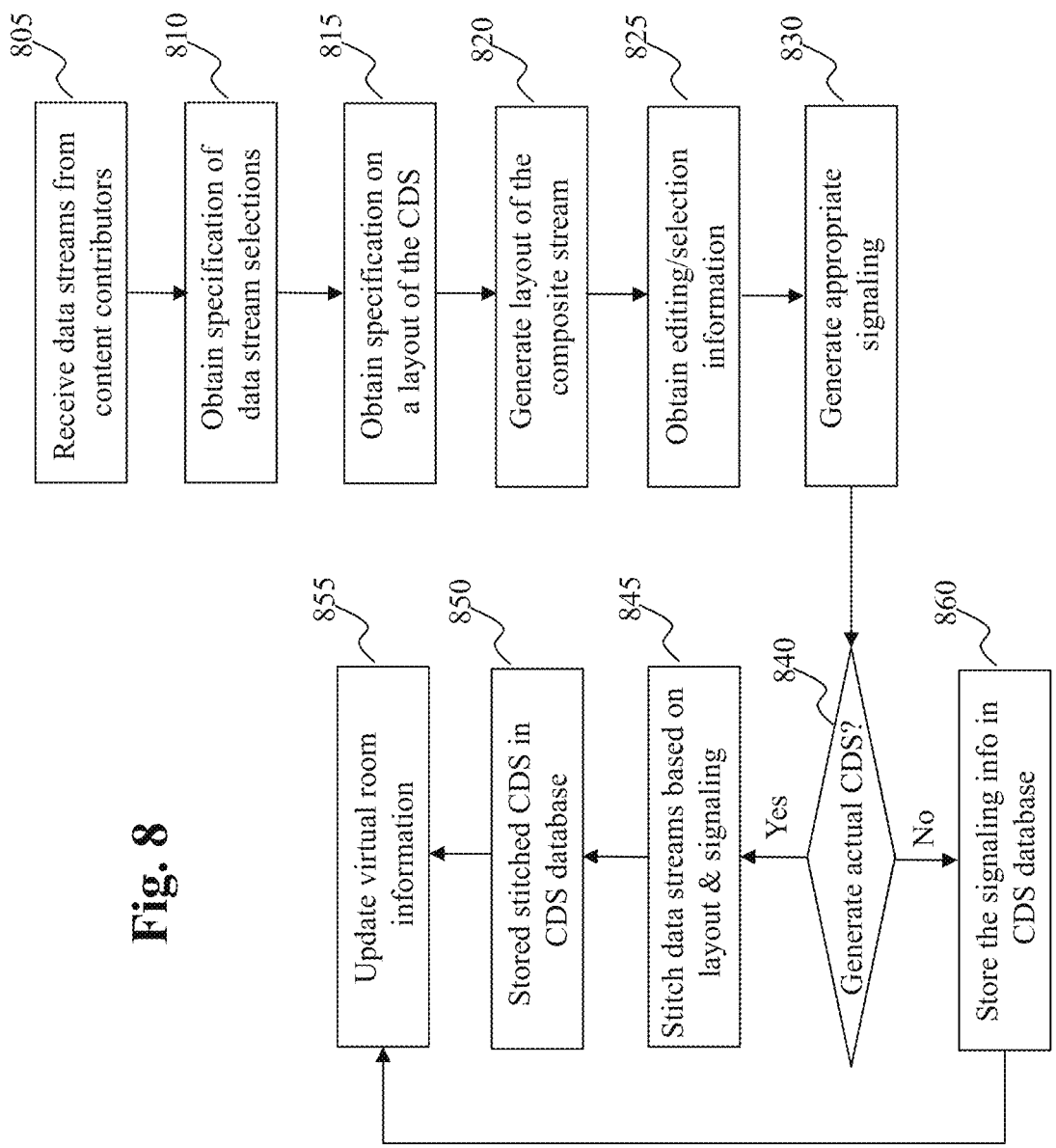
FIG. 8 is a flowchart of an exemplary process of a composite data stream generator, in accordance with an embodiment of the present teaching.

The composite data stream generator 440 as shown in FIG. 7 comprises a contributor data stream receiver 705, a demand based stream selector 700, a composite stream layout generator 720, a stream data editing/selection unit 710, a signaling server 750, a composite data stream stitcher 730, and a virtual room update unit 740. FIG. 8 is a flowchart of an exemplary process of the composite data stream generator 440, in accordance with an embodiment of the present teaching. In operation, to facilitate composite data stream generation and consumption, the contributor data stream receiver 705 receives, at 805, individual data streams from content contributors and informs the demand based stream selector 700 the availability of the received data content from different content contributors. When the demand based stream selector 700 interfaces with a composite content producer who desires to create composite content based on multiple data streams from multiple content contributors, the demand based stream selector 700 presents information related to available data streams to the producer and obtains, at 810, from the producer the selection of data streams to be used to compose the composite data stream.

In addition, the composite stream layout generator 720 may interface with the composite content producer to obtain specifications related to the layout of the composite data stream. As shown in FIGS. 5A-5C, the composite content producer may indicate a specific layout for the composite data stream to be generated. In some embodiments, the composite stream layout generator 720 may also offer alternative default layouts as options that can be selected by the composite content producer. The indication from the composite content producer may be received, at 810, and used to generate, at 820, the layout configuration for the composite data stream to be generated in a composite stream layout configuration storage 725. Furthermore, the stream data editing/selection unit 710 may also interface with the composite content producer to gather information specifying which portions/tracks of each of the selected data streams are to be incorporated in the composite data stream.

In some embodiments, the stream data editing/selection unit 710 may receive information from the demand based stream selector 700 on selected data streams and then access each of the actual selected data stream in order to present the actual data stream selected to the composite content producer to browse the selected data stream and specify, via some editing means, which portions and/or tracks of each of the data streams are to be used for the composite data stream.

In such interfacing with the composite content producer, the stream data editing/selection unit 710 obtains, at 825, the selection specification on which portions/tracks of each of the selected data streams are to be actually incorporated into the composite data stream and then invokes the signaling server 750 to generate, at 830, appropriate signaling information to facilitate the generation of the composite data stream. Such signaling information may be instructions on the content to be displayed in the composite data stream at every timing with respect to each distinct areas of the composite data stream. For instance, with respect to the example layout 510 as illustrated in FIG. 5A, the signal information thereof may indicate, for every timing of the composite data stream, what is to be displayed in window 510-1, 510-2, 510-3, and 510-4. In this example, window 510-1 may display selected portions/tracks of one of the selected video data streams, window 510-2 may display selected portions/tracks of another one of the selected video data streams, window 510-3 may be used to display portions/tracks of a third selected video data streams, and area 510-4 may be used to display the textual content from another different contributor or from the producer. For the content to be presented in each of the windows, there are more detailed signaling information needed such as at what time period, what specific portion of a data stream is to be displayed visually and/or whether the audio track information is to be included as well. If the audio is to be suppressed, the signaling information will specify such so that when composing the composite data stream, the sound corresponding to the visual information displayed will not be included in the composite data stream. In this manner, at different time periods of the composite data stream, different soundtracks may be accompanying the composite data stream in accordance with the specified information from the composite content producer.

As discussed herein, there may be different options as to the composite data stream in terms of the timing of generating the actual composite data stream. With the signaling information generated, it is determined, at 840, whether the actual composite data stream is to be generated and stored in the composite data stream database 140. If it is to be generated prior to access, the composite data stream stitcher 730 stitches, at 845, content from multiple selected data streams according to the layout configuration (in terms of arrangement of multi stream information as shown in, e.g., FIG. 5A) as well as the signaling information which dictates which portions/tracks of the selected data stream to be used at different timings. The generated composite data stream (CDS) is then stored, at 850, in the composite data stream database 140. If the determination at 840 is negative, instead of generating the actual composite data stream and save it, the signaling server 750 stores, at 860, the generated signaling information in the composite data stream database 140 so that it can be used to generate or construct the composite data stream whenever this is a need in the future. After the composite data stream is stored (either in its actual data stream form or in its signaling form), the virtual room update unit 740 updates, at 855, the information associated with the virtual room for which the composite data stream is generated.

Although in this illustrated embodiment, specification of different instructions related to the generation of the composite data stream (selection of data streams, layout and parameters related to content selection from each selected data stream) are obtained by the composite data stream generator 440, such information may also be optionally obtained by other components in the virtual studio manager 120. For instance, such information may be solicited and received by the user interface manager 410 and then passed onto the composite data stream generator 440 to generate the requested composite data stream. In creating new composite data stream, it may be associated with a virtual room. Given that, the user interface manager 410 may also obtain information about a virtual room from a composite content producer. The virtual room may be new and need to be created or it may be existing. When it is needed to create a new virtual room, once being invoked, the virtual room creator 430 creates a new virtual room and then associate with desired composite data stream with it. If the virtual room already exists, the virtual room creator 430 may update the virtual room by including the desired composite data stream in the virtual room. Upon completing the creation/updating of the nw virtual room, the virtual room creator 430 may then invoke the composite data stream generator 440 and pass on the specification related to how to generate the composite data stream thereto.

Figure 9:
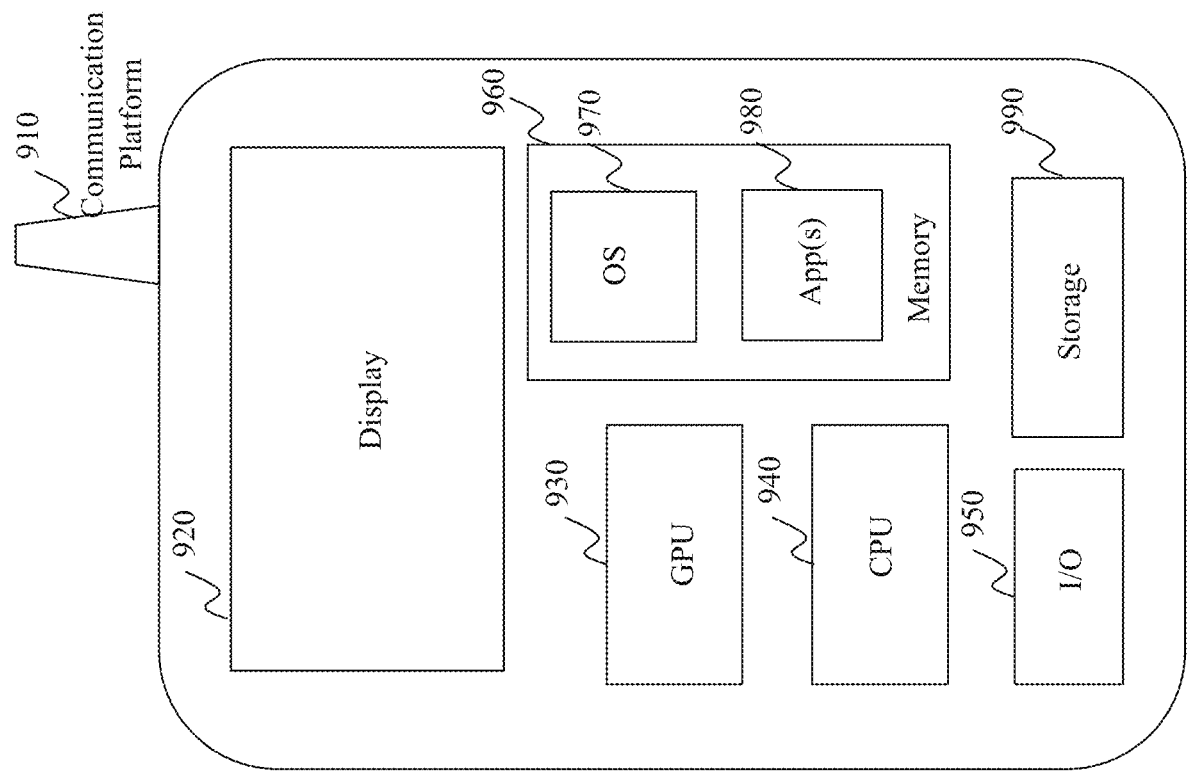
FIG. 9 is an illustrative diagram of an exemplary mobile device architecture that may be used to realize a specialized system implementing the present teaching in accordance with various embodiments.

FIG. 9 is an illustrative diagram of an exemplary mobile device architecture that may be used to realize a specialized system implementing the present teaching in accordance with various embodiments. In this example, the user device on which the present teaching is implemented corresponds to a mobile device 900, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 900 may include one or more central processing units ("CPUs") 940, one or more graphic processing units ("GPUs") 930, a display 920, a memory 960, a communication platform 910, such as a wireless communication module, storage 990, and one or more input/output (I/O) devices 940. Any other suitable component, including but not limited to a system bus or a controller (not shown), may also be included in the mobile device 900. As shown in FIG. 9 a mobile operating system 970 (e.g., iOS, Android, Windows Phone, etc.), and one or more applications 980 may be loaded into memory 960 from storage 990 in order to be executed by the CPU 940. The applications 980 may include a browser or any other suitable mobile apps for managing a conversation system on mobile device 900. User interactions may be achieved via the I/O devices 940 and provided to the automated dialogue companion via network(s) 210.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result the drawings should be self-explanatory.

Figure 10:
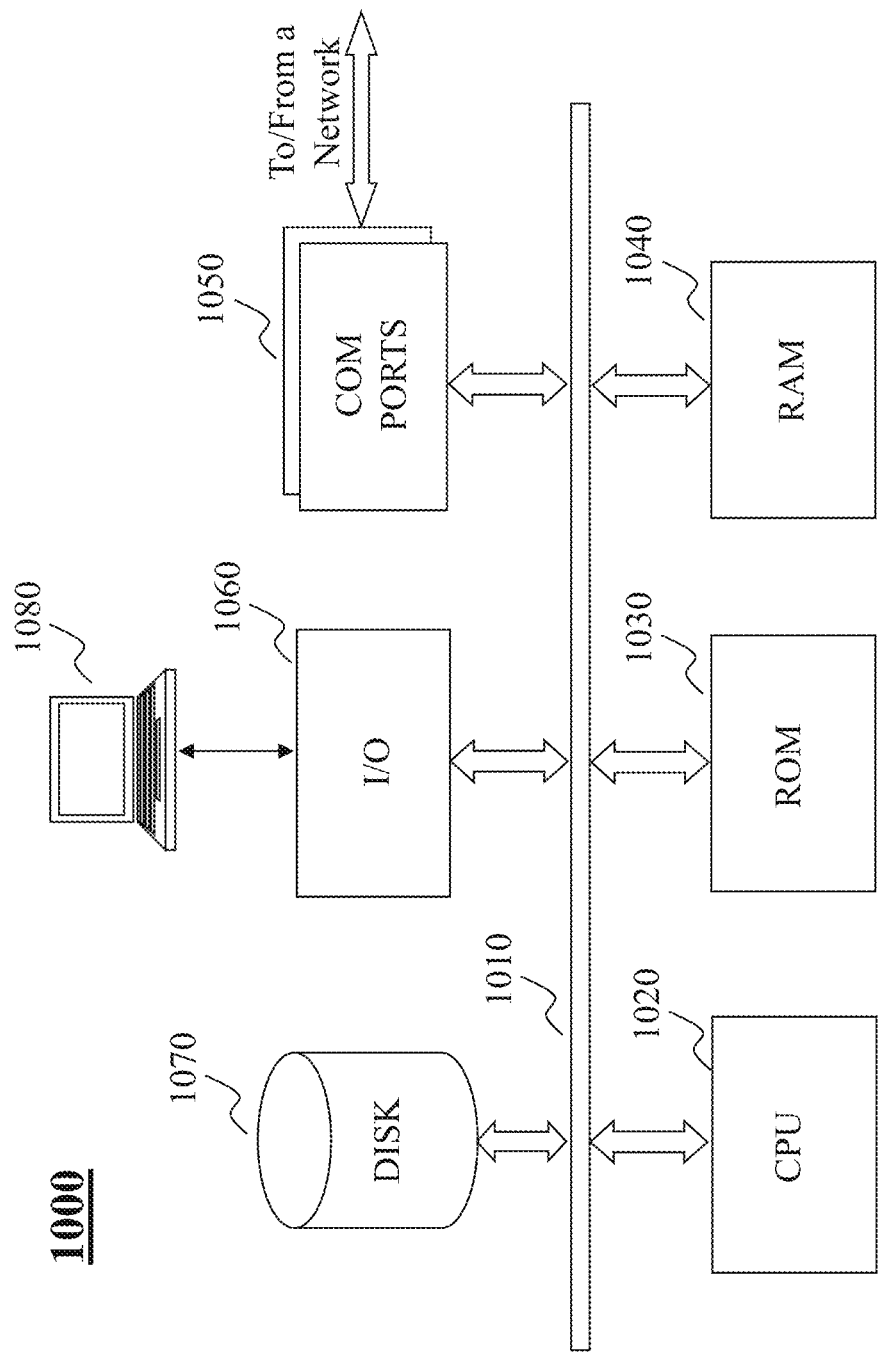
FIG. 10 is an illustrative diagram of an exemplary computing device architecture that may be used to realize a specialized system implementing the present teaching in accordance with various embodiments.

FIG. 10 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1000 may be used to implement any component of conversation or dialogue management system, as described herein. For example, conversation management system may be implemented on a computer such as computer 1000, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 1000, for example, includes COM ports 1050 connected to and from a network connected thereto to facilitate data communications. Computer 1000 also includes a central processing unit (CPU) 1020, in the form of one or more processors, for executing program instructions. The exemplary computer platform includes an internal communication bus 1010, program storage and data storage of different forms (e.g., disk 1070, read only memory (ROM) 1030, or random access memory (RAM) 1040), for various data files to be processed and/or communicated by computer 1000, as well as possibly program instructions to be executed by CPU 1020. Computer 1000 also includes an I/O component 1060, supporting input/output flows between the computer and other components therein such as user interface elements 1080. Computer 1000 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for managing a virtual studio, the method comprising:
receiving, by a centralized virtual studio manager, a plurality of single data streams from a plurality of respective content contributors;
receiving a request, from a composite content producer via a publicly accessible network connection, to create a composite data stream for a virtual room in the virtual studio managed by the centralized virtual studio manager, wherein the request specifies multiple contributing data streams of the plurality of single data streams, a corresponding portion from each of the multiple contributing data streams, and a layout of the multiple portions from the multiple contributing data streams in the composition data stream;
generating, by the centralized virtual studio manager based on the request, the composite data stream by,
identifying the multiple contributing data streams in accordance with the request;
extracting, from the multiple contributing data streams, the respective multiple portions as specified by the request, wherein the extracted multiple portions are to be included in the composite data stream in accordance with the layout, and each of the extracted multiple portions corresponds to a fraction of a corresponding contributing data stream, and
generating signaling information to be used to construct the composite data stream by stitching together the extracted multiple portions of the multiple contributing data streams in accordance with the layout;
receiving an access request from an end user for accessing the composite data stream; and
delivering the composite data stream to the end user in response to the access request.

2. The method of claim 1, wherein the layout specifies a spatial arrangement of the multiple contributing data streams in the composite data stream.

3. The method of claim 1, wherein at least a portion of each of the multiple contributing data streams is to be visualized in the composite data stream simultaneously according to the layout.

4. The method of claim 1, wherein the request further specifies, with respect to each of the multiple contributing data streams, a track of the contributing data stream to be incorporated into the composite data stream.

5. The method of claim 1, further comprising:
announcing the composite data stream associated with the virtual room to one or more end users participating in the virtual room.

6. The method of claim 1, further comprising
analyzing the access request from the end user to identify a desired schedule specified for the access; and
generating scheduling information based on the desired schedule.

7. The method of claim 6, wherein the step of delivering is performed in accordance with the scheduling information.

8. A non-transitory machine readable medium having information recorded thereon for managing a virtual studio, wherein the information, when read by a machine, causes the machine to perform:
receiving, by a centralized virtual studio manager, a plurality of single data streams from a plurality of respective content contributors;
receiving a request, from a composite content producer via a publicly accessible network connection, to create a composite data stream for a virtual room in the virtual studio managed by the centralized virtual studio manager, wherein the request specifies multiple contributing data streams of the plurality of single data streams, a corresponding portion from each of the multiple contributing data streams, and a layout of the multiple portions from the multiple contributing data streams in the composition data stream;
generating, by the centralized virtual studio manager based on the request, the composite data stream by,
identifying the multiple contributing data streams in accordance with the request;
extracting, from the multiple contributing data streams, the respective multiple portions as specified by the request, wherein the extracted multiple portions are to be included in the composite data stream in accordance with the layout, and each of the extracted multiple portions corresponds to a fraction of a corresponding contributing data stream, and
generating signaling information to be used to construct the composite data stream by stitching together the extracted multiple portions of the multiple contributing data streams in accordance with the layout;
receiving an access request from an end user for accessing the composite data stream; and delivering the composite data stream to the end user in response to the access request.

9. The medium of claim 8, wherein the layout specifies a spatial arrangement of the multiple contributing data streams in the composite data stream.

10. The medium of claim 8, wherein at least a portion of each of the multiple contributing data streams is to be visualized in the composite data stream simultaneously according to the layout.

11. The medium of claim 8, wherein the request further specifies, with respect to each of the multiple contributing data streams, a track of the contributing data stream to be incorporated into the composite data stream.

12. The medium of claim 8, wherein the information, when read by the machine, further causes the machine to perform:
announcing the composite data stream associated with the virtual room to one or more end users participating in the virtual room.

13. The medium of claim 8, wherein the information, when read by the machine, further causes the machine to perform:
analyzing the access request from the end user to identify a desired schedule specified for the access; and
generating scheduling information based on the desired schedule.

14. The medium of claim 13, wherein the step of delivering is performed in accordance with the scheduling information.

15. A system for managing a virtual studio, comprising:
a content contributor interface manager, of a centralized virtual studio manager, configured for receiving a plurality of single data streams from a plurality of respective content contributors;
a user interface manager configured for a receiving a request, from a composite content producer via a publicly accessible network connection, to create a composite data stream for a virtual room in the virtual studio managed by the centralized virtual studio manager, wherein the request specifies multiple contributing data streams of the plurality of single data streams, a corresponding portion from each of the multiple contributing data streams, and a layout of the multiple portions from the multiple contributing data streams in the composition data stream; and
a composite data stream generator, of the centralized virtual studio manager, configured for generating, based on the request, the composite data stream by,
identifying the multiple contributing data streams in accordance with the request;
extracting, from the multiple contributing data streams, the respective multiple portions as specified by the request, wherein the extracted multiple portions are to be included in the composite data stream in accordance with the layout, and each of the extracted multiple portions corresponds to a fraction of a corresponding contributing data stream, and
generating signaling information to be used to construct the composite data stream by stitching together the extracted multiple portions of the multiple contributing data streams in accordance with the layout; and
a composite data stream distributor configured for delivering the composite data stream to an end user related to the virtual room in response to an access request received from the end user to access the composite data stream.

16. The system of claim 15, wherein the layout specifies a spatial arrangement of the multiple contributing data streams in the composite data stream.

17. The system of claim 15, wherein at least a portion of each of the multiple contributing data streams is to be visualized in the composite data stream simultaneously according to the layout.

18. The system of claim 15, wherein the request further specifies, with respect to each of the multiple contributing data streams, a track of the contributing data stream to be incorporated into the composite data stream.

19. The system of claim 15, wherein the user interface manager is further configured for:
announcing the composite data stream associated with the virtual room to one or more end users participating in the virtual room;
analyzing the access request from the end user to identify a desire schedule specified for the access; and
generating scheduling information based on the desired schedule.

20. The system of claim 19, wherein the step of delivering is performed in accordance with the scheduling information.

* * * * *